(12) United States Patent
Magri et al.

(10) Patent No.: US 12,574,112 B2
(45) Date of Patent: Mar. 10, 2026

(54) OPTICAL AMPLIFIER APPARATUS AND METHOD

(71) Applicant: Telefonaktiebolaget LM Ericsson (publ), Stockholm (SE)

(72) Inventors: Roberto Magri, Genoa (IT); Alberto Deho, Genoa (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 250 days.

(21) Appl. No.: 18/279,549

(22) PCT Filed: Mar. 3, 2021

(86) PCT No.: PCT/EP2021/055321
§ 371 (c)(1),
(2) Date: Aug. 30, 2023

(87) PCT Pub. No.: WO2022/184249
PCT Pub. Date: Sep. 9, 2022

(65) Prior Publication Data
US 2024/0154693 A1 May 9, 2024

(51) Int. Cl.
*H04B 10/077* (2013.01)
*H04J 14/02* (2006.01)

(52) U.S. Cl.
CPC .......... *H04B 10/0777* (2013.01); *H04J 14/02* (2013.01); *H04J 14/0201* (2013.01)

(58) Field of Classification Search
CPC .............. H04B 10/0777; H04B 10/077; H04B 10/075; H04B 10/073; H04B 10/0731;
(Continued)

(56) References Cited

U.S. PATENT DOCUMENTS

| | | | |
|---|---|---|---|
| 7,826,748 B2 | 11/2010 | Yang et al. | |
| 2005/0174563 A1* | 8/2005 | Evans ................. | H04B 10/071 356/73.1 |

(Continued)

FOREIGN PATENT DOCUMENTS

| | | |
|---|---|---|
| EP | 1349309 A2 | 1/2003 |

OTHER PUBLICATIONS

International Search Report and Written Opinion in PCT/EP2021/055321 dated Jan. 5, 2022, 14 pages.
(Continued)

*Primary Examiner* — Hibret A Woldekidan
(74) *Attorney, Agent, or Firm* — Rothwell, Figg, Ernst & Manbeck, P.C.

(57) ABSTRACT

Optical amplifier apparatus (100) comprising: an input (102) for an incoming optical signal (IN) comprising an optical supervisory channel, OSC, signal and service channel signals at channel wavelengths of a WDM channel wavelength grid; an output (112) for an outgoing optical signal (OUT); an optical amplifier, OA, (106) having an operating bandwidth including the WDM channel wavelength grid; a first optical drop filter (104) configured to drop from an IN signal an out-of-band, OOB, OSC signal at a wavelength outside the OA operating bandwidth; a second optical drop filter (108, 208) configured to drop from an IN signal an in-band, IB, OSC signal at a wavelength within the OA operating bandwidth; an OSC signal output (114) configured to output the dropped OSC signal; an OSC signal input (116) configured to receive an outgoing OOB OSC or IB OSC signal; and an optical add filter (110, 210) configured to add an outgoing OOB OSC or IB OSC signal to service channel signals at channel wavelengths of the WDM channel wavelength grid to form the OUT signal.

16 Claims, 7 Drawing Sheets

(58) Field of Classification Search

CPC ............ H04B 10/0775; H04B 10/0779; H04B 10/0773; H04J 14/02; H04J 14/0201; H04J 14/0205; H04J 14/021; H04J 14/0212; H04J 14/0209; H04J 14/0206; H04J 14/0213

See application file for complete search history.

(56) References Cited

U.S. PATENT DOCUMENTS

| | | | |
|---|---|---|---|
| 2006/0127086 A1* | 6/2006 | Frankel ................ | H04B 10/298 398/19 |
| 2007/0047958 A1* | 3/2007 | Gumaste ............. | H04J 14/0283 398/69 |
| 2009/0028562 A1* | 1/2009 | Gianordoli ............. | H04B 10/29 398/61 |
| 2011/0217036 A1* | 9/2011 | Campanelli ........ | H04B 10/0771 356/73.1 |

OTHER PUBLICATIONS

International Telecommunication Union, Series G: Transmission Systems and Media, Digital Systems and Networks, Optical Interfaces for Multichannel Systems With Optical Amplifiers, G.692, Oct. 1998, 41 pages.

* cited by examiner

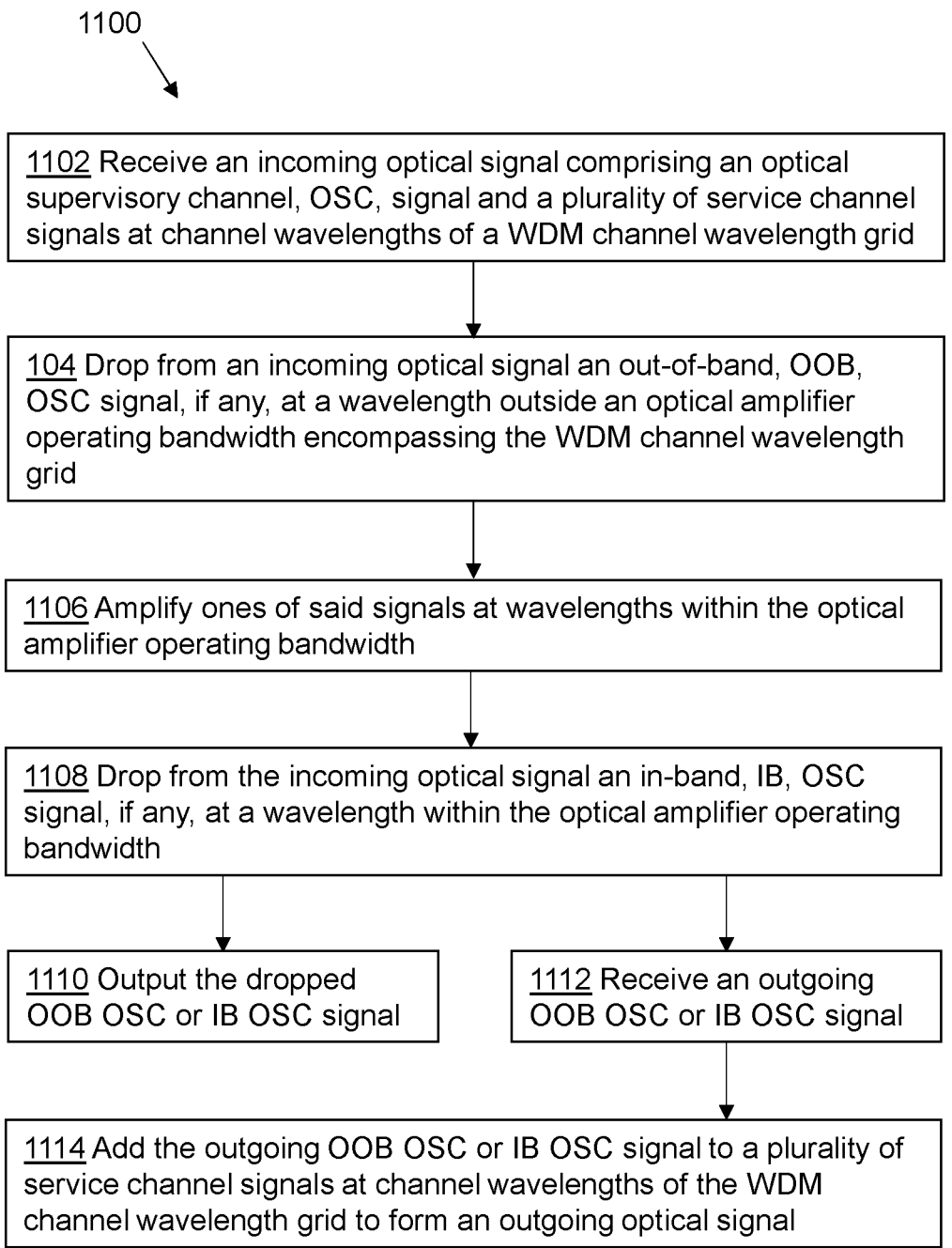

1100

1102 Receive an incoming optical signal comprising an optical supervisory channel, OSC, signal and a plurality of service channel signals at channel wavelengths of a WDM channel wavelength grid 104 Drop from an incoming optical signal an out-of-band, OOB, OSC signal, if any, at a wavelength outside an optical amplifier operating bandwidth encompassing the WDM channel wavelength grid 1106 Amplify ones of said signals at wavelengths within the optical amplifier operating bandwidth 1108 Drop from the incoming optical signal an in-band, IB, OSC signal, if any, at a wavelength within the optical amplifier operating bandwidth 1110 Output the dropped OOB OSC or IB OSC signal 1112 Receive an outgoing OOB OSC or IB OSC signal 1114 Add the outgoing OOB OSC or IB OSC signal to a plurality of service channel signals at channel wavelengths of the WDM channel wavelength grid to form an outgoing optical signal

Fig. 11

OPTICAL AMPLIFIER APPARATUS AND METHOD

CROSS REFERENCE TO RELATED APPLICATION(S)

This application is a 35 U.S.C. § 371 National Stage of International Patent Application No. PCT/EP2021/055321, filed Mar. 3, 2021.

TECHNICAL FIELD

The invention relates to an optical amplifier apparatus, optical amplifier modules and communications network nodes. The invention further relates to a method at a communications network node.

BACKGROUND

Wavelength division multiplexing, WDM, Network elements, NE, use an Optical Supervisory Channel, OSC, to exchange operations, administration and management, OA&M, signals, including monitor information, alarm indications signals, protection and restoration signaling, and to provide extra bandwidth that can support a Data Communication Network, DCN, which is utilized by the NEs to communicate with management and operations systems, OS, for equipment configuration, etc.

The increasing demand of information to be transported over the OSC has caused a growth in the data rate of this interface from 155 Mb/s to 1 GbE, with 10 GbE on the roadmap. This trend poses severe limitations to the reach of the OSC interface.

In amplified WDM multi-hop links the OSC is inserted and terminated at each amplifier section, with two OSC interfaces used; one facing the east and one facing the west link direction. The wavelength utilized by the OSC is typically an out-of-band, OOB, wavelength at 1511 nm; this wavelength is outside the operating bandwidth of the optical amplifiers and so is not amplified. However, according to ITU-T G.692, "Optical interfaces for multichannel systems with optical amplifiers", Annex-B, alternative wavelength choices are possible for the OSC, such as 1480 nm or 1310 nm. Another emerging option is to use 1611 nm as an OOB OSC wavelength. Recently, some suppliers are offering semi-conductor amplifier, SOA, modules to amplify the OOB 1510 nm OSC wavelength and allow a higher link budget.

ITU-T G.692, Annex-B.3 "OSC within EDFA gain bandwidth", reports an In-Band, IB, OSC, for use in amplified DWDM systems when long span distances need to be covered. IB OSC benefits from Optical Amplification and has been used in some long single-hop deployments (e.g. submarine hops or festoons). In this case, one of the WDM traffic channels is replaced with the OSC channel, which is amplified and multiplexed/demultiplexed in the same optical infrastructure used by the traffic channels.

Existing OSC solutions experience various disadvantages, including: limited bit-rate when low bit-rate OSC are used to gain sensitivity and cover longer distances; and limited distance when high bit-rate, e.g. 1 GbE or 10 GbE, OSC are used. There are also hardware implications of using each type of OSC. For an IB OSC, one traffic channel is lost and use of an IB OSC is limited to terminal nodes or optical add-drop multiplexers, OADM; to use IB OSC with optical line amplifier nodes additional external filter boxes are required to handle the OSC, with optical line amplifier nodes external filter boxes must be added to handle the OSC, since amplifier nodes do not have DWDM filters to add/drop the OSC. For an OOB OSC, if dedicated out-of-band (e.g. 1510 nm) SOA modules are used, extra cost and space is required. Integrating the extra hardware required for an IB OSC limits use to higher cost IB OSC links even when a simpler OOB OSC would be enough. In fact, the large majority of links with wide gain range amplifiers are made of short spans where OOB OSC gives a significant cost saving.

SUMMARY

It is an object to provide an improved optical amplifier apparatus. It is a further object to provide an improved optical amplifier module. It is a further object to provide an improved in-line optical amplifier module. It is a further object to provide an improved communications network amplifier node. It is a further object to provide an improved communications network in-line amplifier node. It is a further object to provide an improved method at a communications network node.

An aspect of the invention provides optical amplifier apparatus comprising an input, an output, an optical amplifier, a first optical drop filter, a second optical drop filter, an OSC signal output, an OSC signal input and an optical add filter. The input is for receiving an incoming optical signal comprising an optical supervisory channel, OSC, signal and a plurality of service channel signals at channel wavelengths of a wavelength division multiplexing, WDM, channel wavelength grid. The output is for outputting an outgoing optical signal. The optical amplifier has an input, an output and an operating bandwidth that includes the WDM channel wavelength grid. The first optical drop filter is provided upstream of the optical amplifier input. The first optical drop filter is configured to drop from an incoming optical signal an out-of-band, OOB, OSC signal at a wavelength outside the optical amplifier operating bandwidth. The second optical drop filter is provided downstream of the optical amplifier output. The second optical drop filter is configured to drop from an incoming optical signal an in-band, IB, OSC signal at a wavelength within the optical amplifier operating bandwidth. The OSC signal output is configured to output the OSC signal dropped from the first optical drop filter or the second optical drop filter. The OSC signal input configured to receive an outgoing OOB OSC or IB OSC signal. The optical add filter is provided upstream of the output. The optical add filter is configured to add an outgoing OOB OSC or IB OSC signal to a plurality of service channel signals at channel wavelengths of the WDM channel wavelength grid to form the outgoing optical signal.

The optical amplifier apparatus combines IB and OOB add/drop filtering and enables just IB OSC to be amplified at reception. The optical amplifier apparatus advantageously provides a universal solution for OOB OSC and IB OSC signals and is therefore deployable for both short and long span distances, enabling OSC selection to be optimized on a per-span basis; for example, enabling OOB OSC to be used for short spans and IB OSC to be used for longer spans, where OSC amplification is necessary.

The optical amplifier apparatus advantageously enables the best and most cost-effective OSC approach to be chosen on a per-span basis without requiring additional hardware. The optical amplifier apparatus can advantageously be universally deployed regardless of span loss and OSC type. The optical amplifier apparatus may advantageously be deployed using the same cabling and commissioning rules regardless the OSC type.

In an embodiment, the second optical drop filter is configured to drop an IB OSC signal at one of a wavelength below a lowest channel wavelength of the WDM channel wavelength grid or a wavelength above a highest channel wavelength of WDM channel wavelength grid.

The optical amplifier apparatus may advantageously handle IB OSC signals between the optical amplifier bandwidth edges and the WDM channel wavelength grid. This may enable an IB OSC without requiring use of a WDM channel wavelength.

In an embodiment, the IB OSC signal wavelength is separated from the lowest channel wavelength or the highest channel wavelength respectively by at least a channel spacing of the WDM channel wavelength grid. This may provide effective isolation between the IB OSC and the service channel signals.

In an embodiment, the second optical drop filter is configured to drop an IB OSC signal at a channel wavelength of the WDM channel wavelength grid. The optical amplifier apparatus may advantageously be configured to handle IB OSC signals allocated one of the WDM channel wavelengths.

In an embodiment, the second optical drop filter is configured to drop an IB OSC signal at one of a lowest channel wavelength of the WDM channel wavelength grid or a highest channel wavelength of the WDM channel wavelength grid. A lowest or highest channel wavelength may be preferred for optimal service channel signal management.

In an embodiment, the optical amplifier is one of a switchable gain optical amplifier and an optical amplifier with a gain range of at least 10 dB.

In an embodiment, the WDM channel wavelength grid is a DWDM channel wavelength grid.

In an embodiment, the first optical drop filter, the second optical drop filter and the optical add filter are WDM filters.

In an embodiment, the optical add filter is configured to add OSC signals at the OOB OSC wavelength and at the IB OSC wavelength.

In an embodiment, the optical add filter is configured to add an outgoing OOB OSC or IB OSC signal to the plurality of service channel signals of the incoming optical signal following amplification by the optical amplifier or to a plurality of service channel signals different to the plurality of service channel signals of the incoming optical signal.

In an embodiment, the apparatus further comprises a second optical amplifier having an input, an output and an operating bandwidth that includes the WDM channel wavelength grid. The optical add filter is provided between the output and the second optical amplifier output. The optical add filter is configured to add an outgoing OOB OSC or IB OSC signal to a plurality of service channel signals different to the plurality of service channel signals of the incoming optical signal to form the outgoing optical signal. A universal solution for OOB OSC and IB OSC signals may be advantageously provided at an optical amplifier apparatus, where incoming service channel and OSC signals are received and terminated and different outgoing service channel are provided.

Corresponding embodiments and advantages apply to the optical amplifier module, the in-line optical amplifier module, the communications network node, the communications network in-line amplifier node and the method detailed below.

An aspect of the invention provides an optical amplifier module comprising optical amplifier apparatus. The optical amplifier apparatus comprises an input, an output, an optical amplifier, a first optical drop filter, a second optical drop filter, an OSC signal output, an OSC signal input and an optical add filter. The input is for receiving an incoming optical signal comprising an optical supervisory channel, OSC, signal and a plurality of service channel signals at channel wavelengths of a wavelength division multiplexing, WDM, channel wavelength grid. The output is for outputting an outgoing optical signal. The optical amplifier has an input, an output and an operating bandwidth that includes the WDM channel wavelength grid. The first optical drop filter is provided upstream of the optical amplifier input. The first optical drop filter is configured to drop from an incoming optical signal an out-of-band, OOB, OSC signal at a wavelength outside the optical amplifier operating bandwidth. The second optical drop filter is provided downstream of the optical amplifier output. The second optical drop filter is configured to drop from an incoming optical signal an in-band, IB, OSC signal at a wavelength within the optical amplifier operating bandwidth. The OSC signal output is configured to output the OSC signal dropped from the first optical drop filter or the second optical drop filter. The OSC signal input configured to receive an outgoing OOB OSC or IB OSC signal. The optical add filter is provided upstream of the output. The optical add filter is configured to add an outgoing OOB OSC or IB OSC signal to a plurality of service channel signals at channel wavelengths of the WDM channel wavelength grid to form the outgoing optical signal.

The optical amplifier apparatus advantageously enables an optical amplifier module that provides a universal solution for OOB OSC and IB OSC signals.

An aspect of the invention provides an in-line optical amplifier module comprising a first optical amplifier apparatus and a second optical amplifier apparatus. Each of the first and second optical amplifier apparatus comprises an input, an output, an optical amplifier, a first optical drop filter, a second optical drop filter, an OSC signal output, an OSC signal input and an optical add filter. The input is for receiving an incoming optical signal comprising an optical supervisory channel, OSC, signal and a plurality of service channel signals at channel wavelengths of a wavelength division multiplexing, WDM, channel wavelength grid. The output is for outputting an outgoing optical signal. The optical amplifier has an input, an output and an operating bandwidth that includes the WDM channel wavelength grid. The first optical drop filter is provided upstream of the optical amplifier input. The first optical drop filter is configured to drop from an incoming optical signal an out-of-band, OOB, OSC signal at a wavelength outside the optical amplifier operating bandwidth. The second optical drop filter is provided downstream of the optical amplifier output. The second optical drop filter is configured to drop from an incoming optical signal an in-band, IB, OSC signal at a wavelength within the optical amplifier operating bandwidth. The OSC signal output is configured to output the OSC signal dropped from the first optical drop filter or the second optical drop filter. The OSC signal input configured to receive an outgoing OOB OSC or IB OSC signal. The optical add filter is provided upstream of the output. The optical add filter is configured to add an outgoing OOB OSC or IB OSC signal to a plurality of service channel signals at channel wavelengths of the WDM channel wavelength grid to form the outgoing optical signal. The input of the first optical amplifier apparatus is configured to receive a first incoming optical signal from a first direction and the output of the first optical amplifier apparatus is configured to output a first outgoing optical second in a second direction, different to the first direction. The input of the second optical amplifier apparatus is configured to receive a second incoming optical signal from the second direction and the output of the second optical amplifier apparatus is configured to output a second outgoing optical second in the first direction.

The optical amplifier apparatus advantageously enables an in-line optical amplifier module that provides a universal solution for OOB OSC and IB OSC signals.

A communications network node comprising optical amplifier apparatus. The optical amplifier apparatus comprises an input, an output, an optical amplifier, a first optical drop filter, a second optical drop filter, an OSC signal output, an OSC signal input and an optical add filter. The input is for receiving an incoming optical signal comprising an optical supervisory channel, OSC, signal and a plurality of service channel signals at channel wavelengths of a wavelength division multiplexing, WDM, channel wavelength grid. The output is for outputting an outgoing optical signal. The optical amplifier has an input, an output and an operating bandwidth that includes the WDM channel wavelength grid. The first optical drop filter is provided upstream of the optical amplifier input. The first optical drop filter is configured to drop from an incoming optical signal an out-of-band, OOB, OSC signal at a wavelength outside the optical amplifier operating bandwidth. The second optical drop filter is provided downstream of the optical amplifier output. The second optical drop filter is configured to drop from an incoming optical signal an in-band, IB, OSC signal at a wavelength within the optical amplifier operating bandwidth. The OSC signal output is configured to output the OSC signal dropped from the first optical drop filter or the second optical drop filter. The OSC signal input configured to receive an outgoing OOB OSC or IB OSC signal. The optical add filter is provided upstream of the output. The optical add filter is configured to add an outgoing OOB OSC or IB OSC signal to a plurality of service channel signals at channel wavelengths of the WDM channel wavelength grid to form the outgoing optical signal.

The optical amplifier apparatus advantageously enables a communications network node having a universal solution for OOB OSC and IB OSC signals. The communications network node may be one of a variety of communications network nodes, including, for example, optical line terminals, OLT, optical add-drop multiplexers, OADM, reconfigurable OADM, ROADM, and optical line amplifiers, OLA.

A communications network in-line amplifier node comprising an in-line optical amplifier module. The in-line optical amplifier module comprises a first optical amplifier apparatus and a second optical amplifier apparatus. Each of the first and second optical amplifier apparatus comprises an input, an output, an optical amplifier, a first optical drop filter, a second optical drop filter, an OSC signal output, an OSC signal input and an optical add filter. The input is for receiving an incoming optical signal comprising an optical supervisory channel, OSC, signal and a plurality of service channel signals at channel wavelengths of a wavelength division multiplexing, WDM, channel wavelength grid. The output is for outputting an outgoing optical signal. The optical amplifier has an input, an output and an operating bandwidth that includes the WDM channel wavelength grid. The first optical drop filter is provided upstream of the optical amplifier input. The first optical drop filter is configured to drop from an incoming optical signal an out-of-band, OOB, OSC signal at a wavelength outside the optical amplifier operating bandwidth. The second optical drop filter is provided downstream of the optical amplifier output. The second optical drop filter is configured to drop from an incoming optical signal an in-band, IB, OSC signal at a wavelength within the optical amplifier operating bandwidth. The OSC signal output is configured to output the OSC signal dropped from the first optical drop filter or the second optical drop filter. The OSC signal input configured to receive an outgoing OOB OSC or IB OSC signal. The optical add filter is provided upstream of the output. The optical add filter is configured to add an outgoing OOB OSC or IB OSC signal to a plurality of service channel signals at channel wavelengths of the WDM channel wavelength grid to form the outgoing optical signal. The input of the first optical amplifier apparatus is configured to receive a first incoming optical signal from a first direction and the output of the first optical amplifier apparatus is configured to output a first outgoing optical second in a second direction, different to the first direction. The input of the second optical amplifier apparatus is configured to receive a second incoming optical signal from the second direction and the output of the second optical amplifier apparatus is configured to output a second outgoing optical second in the first direction.

The optical amplifier apparatus advantageously enables a communications network in-line amplifier node having a universal solution for OOB OSC and IB OSC signals.

An aspect of the invention provides a method at a communications network node. The method comprises steps as follows. A step of receiving an incoming optical signal comprising an optical supervisory channel, OSC, signal and a plurality of service channel signals at channel wavelengths of a WDM channel wavelength grid. A step of dropping from an incoming optical signal an out-of-band, OOB, OSC signal, if any, at a wavelength outside an optical amplifier operating bandwidth that includes the WDM channel wavelength grid. A step of amplifying ones of said signals of the incoming optical signal at wavelengths within the optical amplifier operating bandwidth. A step of, after said amplifying, dropping from the incoming optical signal an in-band, IB, OSC signal, if any, at a wavelength within the optical amplifier operating bandwidth. A step of outputting the dropped OOB OSC or IB OSC signal. A step of receiving an outgoing OOB OSC or IB OSC signal. A step of, after the amplifying, adding the outgoing OOB OSC or IB OSC signal to a plurality of service channel signals at channel wavelengths of the WDM channel wavelength grid to form an outgoing optical signal.

The method advantageously enables OSC selection to be optimized on a per-span basis; for example, enabling OOB OSC to be used for short spans and IB OSC to be used for longer spans, where OSC amplification is necessary. The method advantageously enables the best and most cost-effective OSC approach to be chosen on a per-span basis.

Embodiments of the invention will now be described, by way of example only, with reference to the accompanying drawings.

BRIEF DESCRIPTION OF THE DRAWINGS

FIG. 11 is a flowchart illustrating an embodiment of method steps.

DETAILED DESCRIPTION

The same reference numbers will used for corresponding features in different embodiments.

Figure 1:
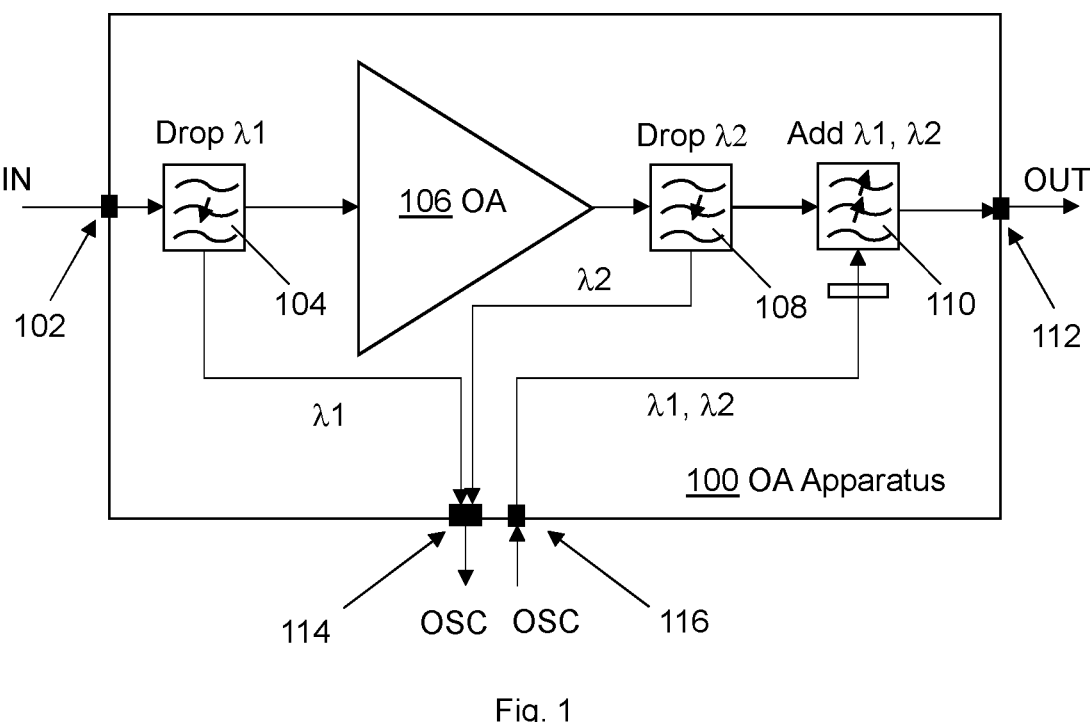
FIGS. 1 to 3 are block diagrams illustrating embodiments of optical amplifier apparatus.

Referring to FIG. 1, an embodiment of the invention provides optical amplifier apparatus 100 comprising an input 102, an output 112, an optical amplifier 106, a first optical drop filter 104, a second optical drop filter 108, an OSC signal output 114, an OSC signal input 116 and an optical add filter 110.

The input 102 is for receiving an incoming optical signal, IN, comprising an OSC signal and a plurality of service channel signals at channel wavelengths of a WDM channel wavelength grid. The output 112 is for outputting an outgoing optical signal, OUT.

The optical amplifier, OA, 106 has an input, an output and an operating bandwidth that includes the WDM channel wavelength grid.

The first optical drop filter 104 is provided upstream of the optical amplifier input. The first optical drop filter is configured to drop from an incoming optical signal, IN, an out-of-band, OOB, OSC signal at a wavelength, λ1, outside the optical amplifier operating bandwidth.

The second optical drop filter 108 is provided downstream of the optical amplifier output. The second optical drop filter is configured to drop from an incoming optical signal an in-band, IB, OSC signal at a wavelength, λ2, within the optical amplifier operating bandwidth.

The OSC signal output 114 is configured to output the OSC signal dropped from the first drop filter or from the second drop filter. The OSC signal input 116 is configured to receive an outgoing OOB OSC signal at λ1 or IB OSC signal at λ2.

The optical add filter 110 is provided upstream of the output 112. The optical add filter is configured to add an outgoing OOB OSC or IB OSC signal to a plurality of service channel signals at channel wavelengths of the WDM channel wavelength grid to form the outgoing optical signal, OUT.

As the skilled person would expect, in normal operation there will be a single OSC signal alongside the service channel signals in an incoming optical signal. The OSC signal will be at an in-band, IB, OSC wavelength, λ1, or at an out-of-band, OOB, OSC wavelength, λ2, and the service channel signals will be at respective channel wavelengths of the WDM channel wavelength grid.

In operation, for an incoming optical signal in which the OSC signal is an OOB OSC signal, the incoming signal is received at the first optical drop filter 104, which acts to drop the OOB OSC signal to the OSC signal output 114, and the service channel signals are transmitted by the first optical drop filter 104 to the optical amplifier 106, which amplifies the service channel signals as they pass through it. The service channel signals are transmitted by the second optical drop filter 108 and continue on to the optical add filter 110. An outgoing OSC signal, which may be an OOB OSC or an IB OSC, received at the OSC signal input 116 is added to the service channel signals by the optical add filter 110 to form an outgoing optical signal comprising the service channel signals and the outgoing OSC signal.

For an incoming signal in which the OSC signal is an IB OSC signal, the configuration of the optical amplifier apparatus 100 remains the same, but what happens to the incoming signal is different. The incoming signal is received at the first optical drop filter 104, which transmits the IB OSC signal and the service channel signals to the optical amplifier 106. The optical amplifier amplifies the IB OSC signal and the service channel signals as they pass through it. The IB OSC signal and the service channel signals then arrive at the second drop filter 108, which acts to drop the IB OSC signal to the OSC output 114. The service channel signals are transmitted by the second optical drop filter 108 and continue on to the optical add filter 110. An outgoing OSC signal, which may be an OOB OSC or an IB OSC, received at the OSC signal input 116 is added to the service channel signals by the optical add filter 110 to form an outgoing optical signal comprising the service channel signals and the outgoing OSC signal.

In the embodiment of FIG. 1, the OSC output 114 requires two optical connectors, one for each type of OSC signal. In an alternative, the OSC output 114 has a single optical connector and an optical combiner is provided, such as the optical combiner 212 shown in FIG. 2, described below, to route the OSC signal drop paths from the first optical drop filter 104 and the second optical drop filter 108 to the same optical connector at the OSC output.

The optical amplifier 106 may be a switchable gain optical amplifier. Alternatively, the optical amplifier 106 may be an optical amplifier with a wide gain range, preferably a gain range of at least 10 dB.

Figure 2:
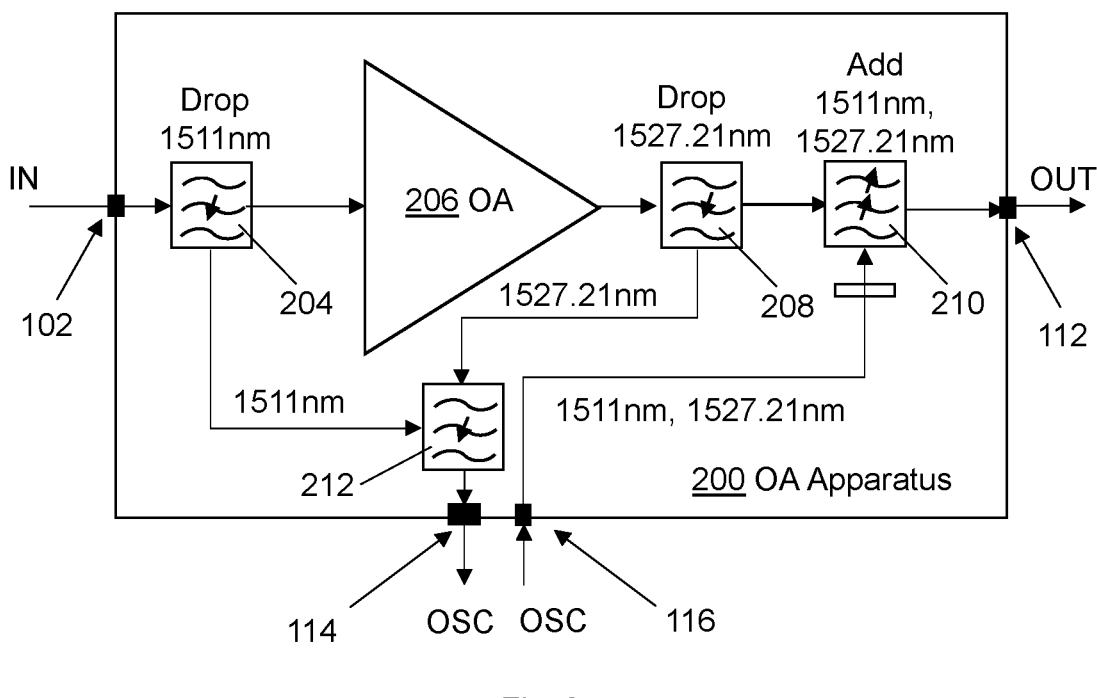

In an embodiment, shown in FIG. 2, the first optical drop filter 204, the second optical drop filter 208 and the optical add filter 210 are WDM filters. The optical amplifier apparatus 200 of this embodiment additionally comprises an optical combiner 212 provided between the first and second WDM filters 204, 208 and the OSC output 114. The optical combiner is configured to merge the drop paths from the first WDM filter 204 and the second WDM filter 208 to the OSC output 114. The optical combiner 212 may also be a WDM filter.

In the optical amplifier apparatus 200 of FIG. 2, the first drop filter is configured to drop OOB OSC signals at a wavelength of 1511 nm; as the skilled person will be aware, it is well known to use OOB OSC signals at this wavelength. The second drop filter is configured to drop IB OSC signals a wavelength below the lowest channel wavelength of the WDM channel wavelength grid. Specifically, the second drop filter is configured to drop IB OSC signals at 1527.21 nm, for use, for example, with a 48 channel DWDM system having a first (lowest) channel wavelength of 1528.7 nm. A 48 channel DWDM system typically has a channel spacing of 0.7 nm. The IB OSC signal wavelength is therefore separated from the lowest channel wavelength by at least a channel spacing; this ensures effective isolation between the OSC signal and the service channel signals.

The optical add filter 210 of the optical amplifier apparatus 200 is configured to add outgoing OOB OSC signals at 1511 nm and outgoing IB OSC signals at 1527.21 nm to the service channel signals.

Figure 3:
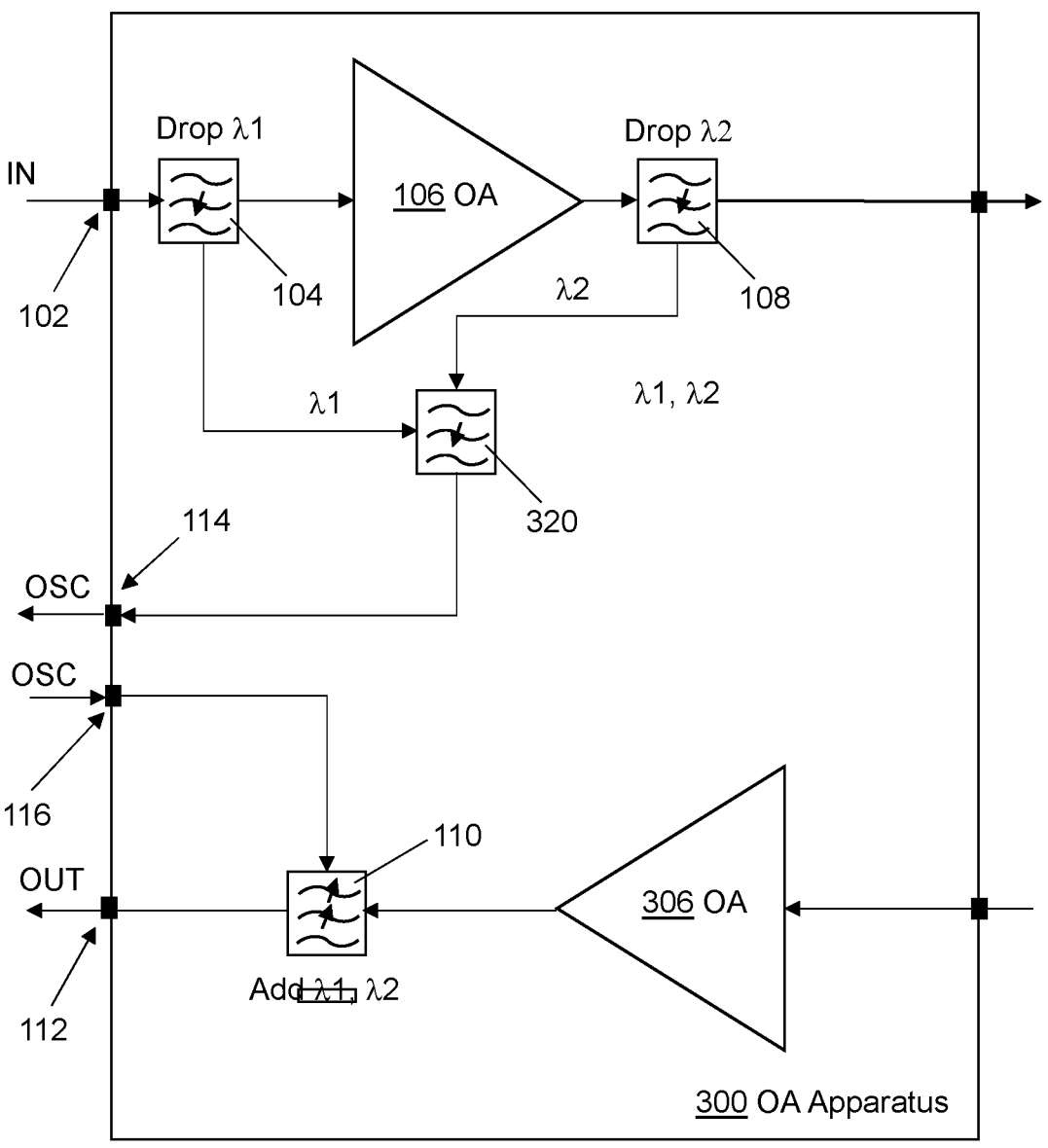

The optical amplifier 206 may be a switchable gain optical amplifier. Alternatively, the optical amplifier 106 may be an optical amplifier with a wide gain range, preferably a gain range of at least 10 dB. Referring to FIG. 3, an embodiment provides optical amplifier, OA, apparatus 300 additionally comprising a second optical amplifier, OA, 306 and an optical combiner 320.

The optical combiner is provided between the first and second optical drop filters 104, 108 and the OSC output 114. The optical combiner is configured to merge the drop paths from the first optical drop filter 104 and the second optical drop filter 108 to the OSC output 114.

The second OA 306 has an input, an output and an operating bandwidth that includes the WDM channel wavelength grid.

The optical add filter 110 is provided between the output 112 and the output of the second optical amplifier 306. The optical add filter is configured to add an outgoing OOB OSC or IB OSC signal to a plurality of service channel signals different to the plurality of service channel signals of the incoming optical signal to form the outgoing optical signal, OUT. The service channel signals of the incoming optical signal, IN, are terminated at the OA apparatus 300 and different service channel signals are provided to the input of the second OA 306 for forming the outgoing optical signal.

The second OA 306 may be an a switchable gain optical amplifier. Alternatively, the second OA 306 may be an optical amplifier with a wide gain range, preferably a gain range of at least 10 dB.

Figure 4:
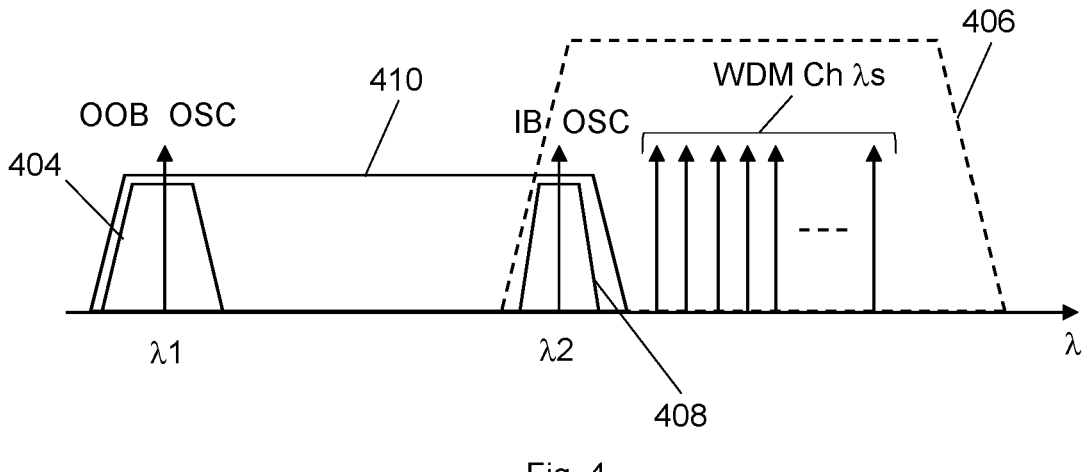
FIGS. 4 to 6 illustrate spectral filter characteristics of optical amplifier apparatus of embodiments.

FIG. 4 illustrates the spectral characteristics of the optical amplifier 106, the first optical drop filter 104, the second optical drop filter 108 and the optical add filter 110 of an optical amplifier apparatus 100 as illustrated in FIG. 1.

The optical amplifier, OA, 106 has an operating bandwidth 406 that includes the WDM channel wavelength grid, WDM Ch λs.

The first optical drop filter 104 has filter bandwidth 404 that lies below the optical amplifier operating bandwidth and includes the OOB OSC signal wavelength, λ1. The first optical filter is thus configured to drop from an incoming optical signal, IN, an OOB OSC signal at λ1.

The second optical drop filter 108 has filter bandwidth 408 that lies within the optical amplifier operating bandwidth, below the WDM Ch λs, and includes the IB OSC signal wavelength, λ2. The second optical filter is thus configured to drop from an incoming optical signal an IB OSC signal at a wavelength below a lowest channel wavelength of the WDM Ch λs.

The optical add filter 110 has a filter bandwidth 410 that includes both the OOB OSC signal wavelength, λ1 and the IB OSC signal wavelength, λ2. The optical add filter is thus configured to add outgoing OOB OSC signals at λ1 and to add IB OSC signals at λ2 to service channel signals of the incoming optical signal, IN, to form the outgoing optical signal, OUT.

Figure 5:
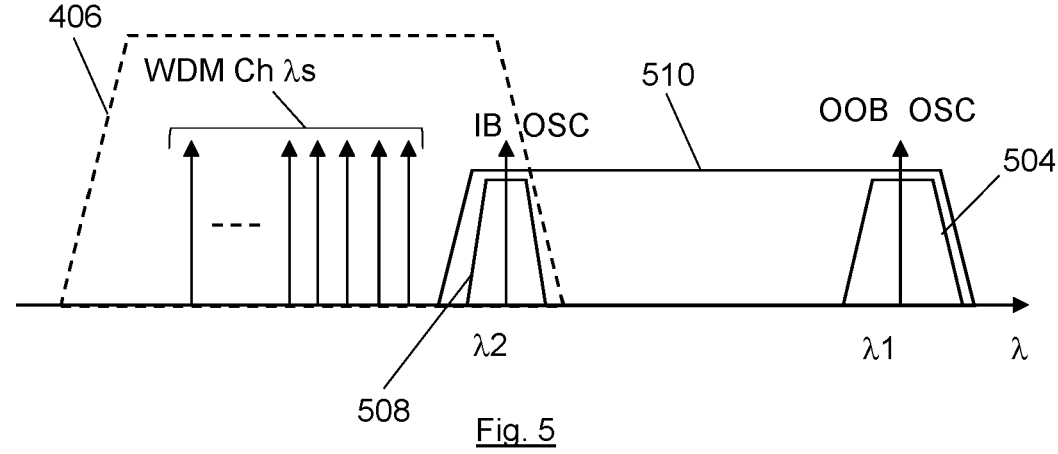

FIG. 5 illustrates the spectral characteristics of the optical amplifier 106, the first optical drop filter 104, the second optical drop filter 108 and the optical add filter 110 of an optical amplifier apparatus according to an embodiment similar to the optical amplifier apparatus 100 of FIG. 1.

In this embodiment, the first optical drop filter 104 has filter bandwidth 504 that lies above the optical amplifier operating bandwidth 406 and includes an OOB OSC signal wavelength, λ1. The second optical drop filter 108 has filter bandwidth 508 that lies within the optical amplifier operating bandwidth, above the WDM Ch λs, and includes an IB OSC signal wavelength, λ2. The second optical drop filter 108 is thus configured to drop an IB OSC signal at a wavelength above a highest channel wavelength of the WDM Ch λs.

The IB OSC signal wavelength, λ2, is separated from the lowest channel wavelength by at least a channel spacing of the WDM Ch λs.

The optical add filter 110 has a filter bandwidth 510 that includes both the OOB OSC signal wavelength, λ1 and the IB OSC signal wavelength, λ2.

Figure 6:
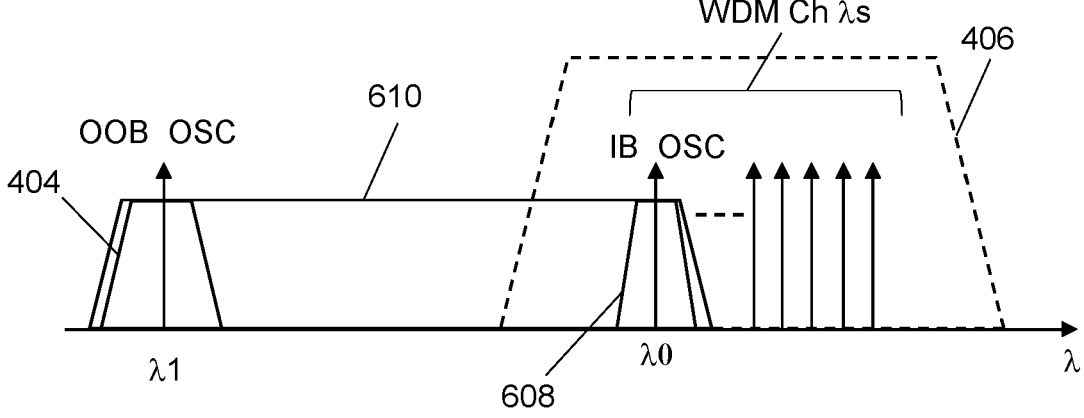

Referring to FIG. 6, in an embodiment, the first optical drop filter 104 has filter bandwidth 404 that lies below the optical amplifier operating bandwidth 406 and includes the OOB OSC signal wavelength, λ1. The second optical drop filter 108 has filter bandwidth 608 that lies within the optical amplifier operating bandwidth, and includes the lowest channel wavelength, λ0, of the WDM Ch λs. The second optical drop filter 108 of this embodiment is thus configured to drop an IB OSC signal at the lowest channel wavelength of the WDM Ch λs.

The optical add filter 110 has a filter bandwidth 610 that includes both the OOB OSC signal wavelength, λ1 and the IB OSC signal wavelength/lowest channel wavelength, λ0.

In an embodiment, the second optical drop filter 108 has filter bandwidth that lies within the optical amplifier operating bandwidth, and includes the highest channel wavelength of the WDM Ch λs. The second optical drop filter of this embodiment is thus configured to drop an IB OSC signal at the highest channel wavelength of the WDM Ch λs.

In an embodiment, the WDM channel wavelength grid is a DWDM channel wavelength grid. For example, as specified in ITU-T G.694.1 "Spectral grids for WDM applications: DWDM frequency grid".

Figure 7:
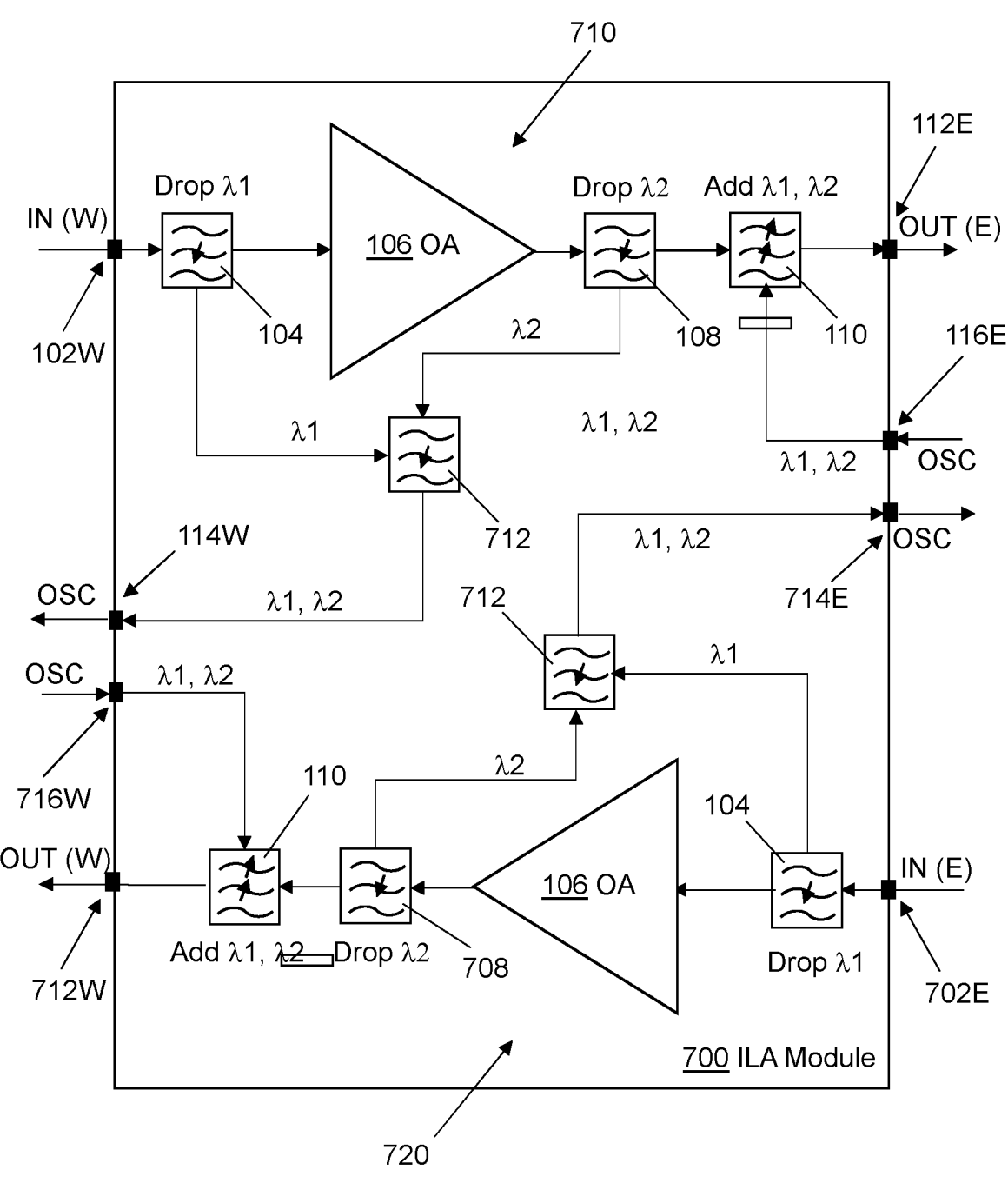
FIG. 7 is a block diagram illustrating an embodiment of an in-line optical amplifier module.

An embodiment provides an in-line optical amplifier, ILA, module 750, as illustrated in FIG. 7. The ILA module comprises a first optical amplifier apparatus 710 and second optical amplifier apparatus 720.

The first optical amplifier apparatus 710 is similar to the optical amplifier apparatus 100 of FIG. 1, with the addition of an optical combiner 712, to route the OSC signal drop paths from its first optical drop filter 104 and its second optical drop filter 108 to the same optical connector at a first OSC output 114W. The input 102W of the first optical amplifier apparatus 710 is configured to receive a first incoming optical signal, IN, from the West, W, direction. The output 112E of the first optical amplifier apparatus 710 is for outputting a first outgoing optical signal, OUT, to the East, E, direction.

The second optical amplifier apparatus 720 is also similar to the optical amplifier apparatus 100 of FIG. 1, with the addition of an optical combiner 712, to route the OSC signal drop paths from its first optical drop filter 104 and its second optical drop filter 108 to the same optical connector at a second OSC output 114W. The input 102E of the second optical amplifier apparatus 720 is configured to receive a second incoming optical signal, IN, from the East, E, direction. The output 112W of the second optical amplifier apparatus 710 is for outputting a second outgoing optical signal, OUT, to the West, W, direction.

Figure 8:
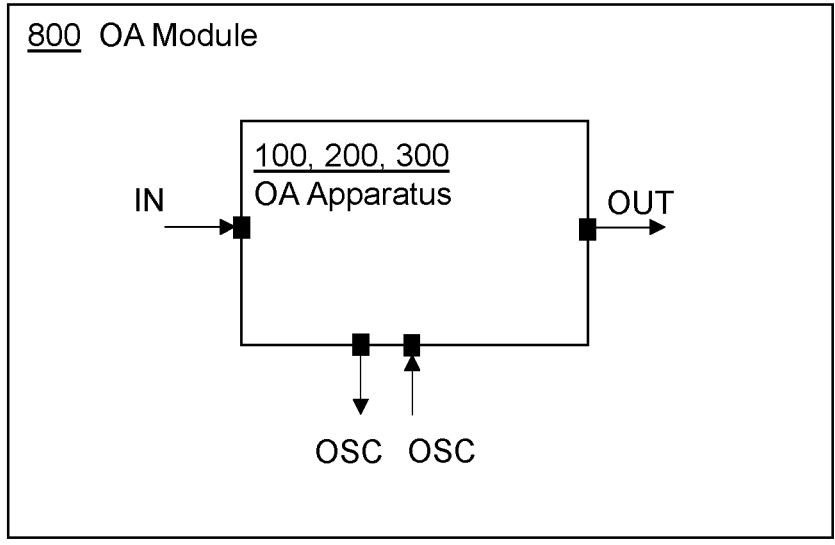
FIG. 8 is a block diagram illustrating an embodiment of an optical amplifier module.

Referring to FIG. 8, an embodiment provides an optical amplifier module 800 comprising optical amplifier apparatus 100, 200, 300 as described above with reference to any of FIG. 1 to 6.

Figure 9:
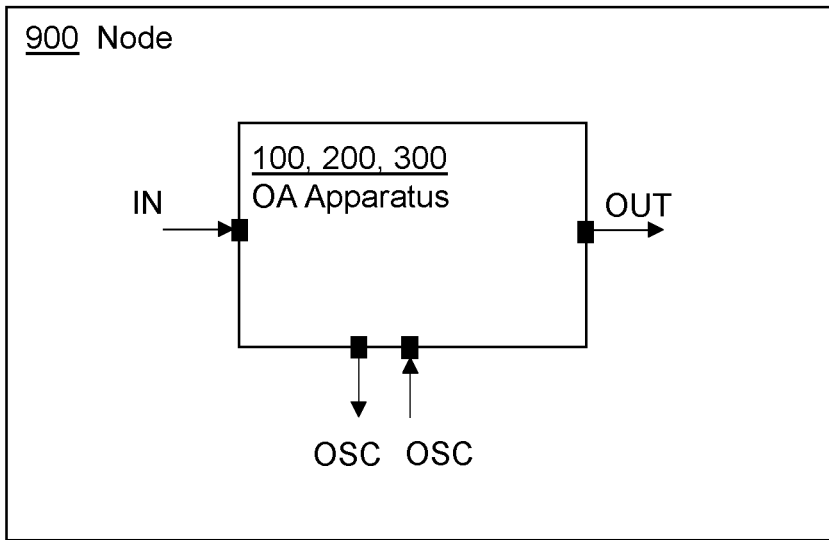
FIG. 9 is a block diagram illustrating an embodiment of an communications network node.

Referring to FIG. 9, an embodiment provides communications network node 900 comprising optical amplifier apparatus 100, 200, 300 as described above with reference to any of FIG. 1 to 6.

In an embodiment, the communications network node 900 is one of a Terminal Node, an optical add-drop multiplexer, OADM, node or a reconfigurable OADM, ROADM, node.

Figure 10:
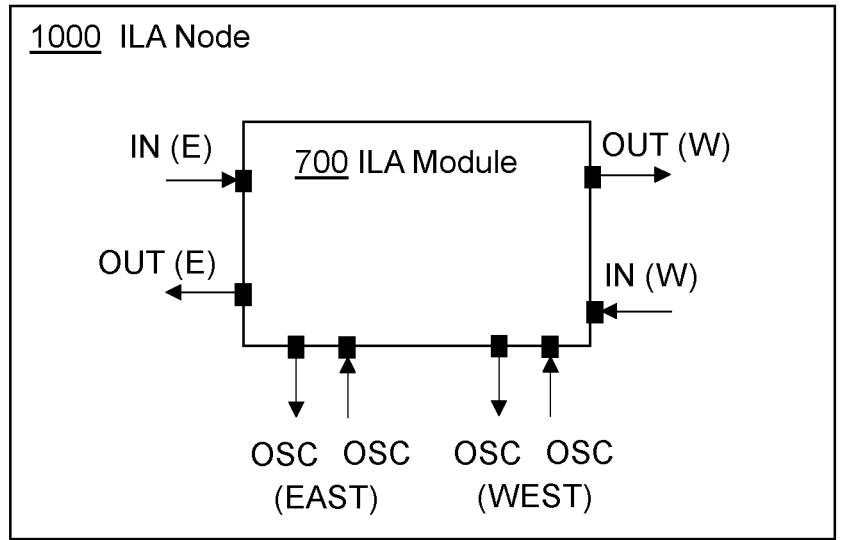
FIG. 10 is a block diagram illustrating an embodiment of a communications network in-line amplifier node.

Referring to FIG. 10, an embodiment provides communications network in-line amplifier, ILA, node 1000 comprising an in-line optical amplifier module 700 as described above with reference to FIG. 7.

An embodiment provides a method 1100 at a communications network node comprising steps as illustrated in FIG. 11.

The method 1100 comprises steps of:
receiving 1002 an incoming optical signal comprising an optical supervisory channel, OSC, signal and a plurality of service channel signals at channel wavelengths of a WDM channel wavelength grid;

dropping 100 from an incoming optical signal an out-of-band, OOB, OSC signal, if any, at a wavelength outside an optical amplifier operating bandwidth encompassing the WDM channel wavelength grid;

amplifying 1006 ones of said signals of the incoming optical signal at wavelengths within the optical amplifier operating bandwidth;

after said amplifying 1006, dropping 1008 from the incoming optical signal an in-band, IB, OSC signal, if any, at a wavelength within the optical amplifier operating bandwidth;

outputting 1010 the dropped OOB OSC or IB OSC signal;

receiving 1012 an outgoing OOB OSC or IB OSC signal; and after the amplifying, adding 1014 the outgoing OOB OSC or IB OSC signal to a plurality of service channel signals at channel wavelengths of the WDM channel wavelength grid to form an outgoing optical signal.

The invention claimed is:

1. Optical amplifier apparatus comprising:

an input for receiving an incoming optical signal comprising an optical supervisory channel, OSC, signal and a plurality of service channel signals at channel wavelengths of a wavelength division multiplexing, WDM, channel wavelength grid;

an output for outputting an outgoing optical signal;

an optical amplifier having an input, an output and an operating bandwidth that includes the WDM channel wavelength grid;

a first optical drop filter provided upstream of the optical amplifier input, the first optical drop filter configured to drop from an incoming optical signal an out-of-band, OOB, OSC signal at a wavelength outside the optical amplifier operating bandwidth;

a second optical drop filter provided downstream of the optical amplifier output, the second optical drop filter configured to drop from an incoming optical signal an in-band, IB, OSC signal at a wavelength within the optical amplifier operating bandwidth;

an OSC signal output configured to output the OSC signal dropped from the first optical drop filter or the second optical drop filter;

an OSC signal input configured to receive an outgoing OOB OSC or IB OSC signal; and an optical add filter provided upstream of the output, the optical add filter configured to add an outgoing OOB OSC or IB OSC signal to a plurality of service channel signals at channel wavelengths of the WDM channel wavelength grid to form the outgoing optical signal.

2. Apparatus as claimed in claim 1, wherein the second optical drop filter is configured to drop an IB OSC signal at one of a wavelength below a lowest channel wavelength of the WDM channel wavelength grid or a wavelength above a highest channel wavelength of WDM channel wavelength grid.

3. Apparatus as claimed in claim 2, wherein the IB OSC signal wavelength is separated from the lowest channel wavelength or the highest channel wavelength respectively by at least a channel spacing of the WDM channel wavelength grid.

4. Apparatus as claimed in claim 1, wherein the second optical drop filter is configured to drop an IB OSC signal at a channel wavelength of the WDM channel wavelength grid.

5. Apparatus as claimed in claim 4, wherein the second optical drop filter is configured to drop an IB OSC signal at one of a lowest channel wavelength of the WDM channel wavelength grid or a highest channel wavelength of the WDM channel wavelength grid.

6. Apparatus as claimed in claim 1, wherein the optical amplifier is one of a switchable gain optical amplifier and an optical amplifier with a gain range of at least 10 dB.

7. Apparatus as claimed in claim 1, wherein the WDM channel wavelength grid is a DWDM channel wavelength grid.

8. Apparatus as claimed in claim 1, wherein the first optical drop filter, the second optical drop filter and the optical add filter are WDM filters.

9. Apparatus as claimed in claim 1, wherein the optical add filter is configured to add OSC signals at the OOB OSC wavelength and at the IB OSC wavelength.

10. Apparatus as claimed in claim 1, wherein the optical add filter is configured to add an outgoing OOB OSC or IB OSC signal to the plurality of service channel signals of the incoming optical signal following amplification by the optical amplifier or to a plurality of service channel signals different to the plurality of service channel signals of the incoming optical signal.

11. Apparatus as claimed in claim 1, further comprising a second optical amplifier having an input, an output and an operating bandwidth that includes the WDM channel wavelength grid, and wherein:

the optical add filter is provided between the output and the second optical amplifier output; and the optical add filter is configured to add an outgoing OOB OSC or IB OSC signal to a plurality of service channel signals different to the plurality of service channel signals of the incoming optical signal to form the outgoing optical signal.

12. An optical amplifier module comprising optical amplifier apparatus as claimed in claim 1.

13. A communications network node comprising optical amplifier apparatus as claimed in claim 1.

14. An in-line optical amplifier module comprising:

a first optical amplifier apparatus comprising:

an input for receiving an incoming optical signal comprising an optical supervisory channel, OSC, signal and a plurality of service channel signals at channel wavelengths of a wavelength division multiplexing, WDM, channel wavelength grid;

an output for outputting an outgoing optical signal;

an optical amplifier having an input, an output and an operating bandwidth that includes the WDM channel wavelength grid;

a first optical drop filter provided upstream of the optical amplifier input, the first optical drop filter configured to drop from an incoming optical signal an out-of-band, OOB, OSC signal at a wavelength outside the optical amplifier operating bandwidth;

a second optical drop filter provided downstream of the optical amplifier output, the second optical drop filter configured to drop from an incoming optical signal an in-band, IB, OSC signal at a wavelength within the optical amplifier operating bandwidth;

an OSC signal output configured to output the OSC signal dropped from the first optical drop filter or the second optical drop filter;

an OSC signal input configured to receive an outgoing OOB OSC or IB OSC signal; and an optical add filter provided upstream of the output, the optical add filter configured to add an outgoing OOB OSC or IB OSC signal to a plurality of service channel signals at channel wavelengths of the WDM channel wavelength grid to form the outgoing optical signal, wherein the input is configured to receive a first incoming optical signal from a first direction and the output is configured to output a first outgoing optical second in a second direction, different to the first direction; and a second optical amplifier apparatus comprising:

an input for receiving an incoming optical signal comprising an optical supervisory channel, OSC, signal and a plurality of service channel signals at channel wavelengths of a wavelength division multiplexing, WDM, channel wavelength grid;

an output for outputting an outgoing optical signal;

an optical amplifier having an input, an output and an operating bandwidth that includes the WDM channel wavelength grid;

a first optical drop filter provided upstream of the optical amplifier input, the first optical drop filter configured to drop from an incoming optical signal an out-of-band, OOB, OSC signal at a wavelength outside the optical amplifier operating bandwidth;

a second optical drop filter provided downstream of the optical amplifier output, the second optical drop filter configured to drop from an incoming optical signal an in-band, IB, OSC signal at a wavelength within the optical amplifier operating bandwidth;

an OSC signal output configured to output the OSC signal dropped from the first optical drop filter or the second optical drop filter;

an OSC signal input configured to receive an outgoing OOB OSC or IB OSC signal; and an optical add filter provided upstream of the output, the optical add filter configured to add an outgoing OOB OSC or IB OSC signal to a plurality of service channel signals at channel wavelengths of the WDM channel wavelength grid to form the outgoing optical signal, wherein the input is configured to receive a second incoming optical signal from the second direction and the output is configured to output a second outgoing optical second in the first direction.

15. A communications network in-line amplifier node comprising an in-line optical amplifier module as claimed in claim 14.

16. A method at a communications network node, the method comprising steps of receiving an incoming optical signal comprising an optical supervisory channel, OSC, signal and a plurality of service channel signals at channel wavelengths of a WDM channel wavelength grid;

dropping from an incoming optical signal an out-of-band, OOB, OSC signal, if any, at a wavelength outside an optical amplifier operating bandwidth that includes the WDM channel wavelength grid;

amplifying ones of said signals of the incoming optical signal at wavelengths within the optical amplifier operating bandwidth;

after said amplifying, dropping from the incoming optical signal an in-band, IB, OSC signal, if any, at a wavelength within the optical amplifier operating bandwidth;

outputting the dropped OOB OSC or IB OSC signal;

receiving an outgoing OOB OSC or IB OSC signal; and after the amplifying, adding the outgoing OOB OSC or IB OSC signal to a plurality of service channel signals at channel wavelengths of the WDM channel wavelength grid to form an outgoing optical signal.

*  *  *  *  *